United States Patent
Fukuta et al.

(10) Patent No.: US 7,156,934 B2
(45) Date of Patent: Jan. 2, 2007

(54) METHOD OF MANUFACTURING CERAMIC HONEYCOMB STRUCTURAL BODY, AND CERAMIC HONEYCOMB STRUCTURAL BODY

(75) Inventors: Ken Fukuta, Ama-gun (JP); Tomoko Ota, Seto (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/507,122

(22) PCT Filed: Mar. 14, 2003

(86) PCT No.: PCT/JP03/03084

§ 371 (c)(1),
(2), (4) Date: Sep. 10, 2004

(87) PCT Pub. No.: WO03/082541

PCT Pub. Date: Oct. 9, 2003

(65) Prior Publication Data

US 2005/0161148 A1  Jul. 28, 2005

(30) Foreign Application Priority Data

Mar. 28, 2002  (JP) .............................. 2002-092433

(51) Int. Cl.
  *B32B 38/04*  (2006.01)
  *C04B 33/32* (2006.01)
  *B01D 39/20* (2006.01)
  *B23K 26/38* (2006.01)
(52) U.S. Cl. ..................... 156/89.22; 156/64; 156/253; 156/272.8; 264/40.1; 264/400; 264/630; 264/638; 55/523

(58) Field of Classification Search ................ 264/630, 264/631; 156/89.22
See application file for complete search history.

(56) References Cited

U.S. PATENT DOCUMENTS 4,448,828 A * 5/1984 Mochida et al. ........... 428/34.4
4,557,773 A * 12/1985 Bonzo ........................ 156/64

(Continued)

FOREIGN PATENT DOCUMENTS

EP  0 549 873 A1  7/1993

(Continued)

*Primary Examiner*—Melvin Mayes
(74) *Attorney, Agent, or Firm*—Oliff & Berridge, PLC (57) ABSTRACT

A method of manufacturing a ceramic honeycomb structure of the present invention, comprising the steps of: stamping sheets onto opposite end faces of a ceramic honeycomb body having a plurality of cells and formed into a honeycomb shape; drilling holes in the sheets at positions corresponding to opening parts of the cells; filling, through the holes, a slurry for sealing into the opening parts of the cells in the opposite end faces of the ceramic honeycomb body; firing the body; and alternately sealing the opening parts of the cells, characterized by comprising the steps of: forming the ceramic honeycomb body into a shape having at least one reference cell different in the shape of the opening part in the end face from the other cells; and drilling the holes in the sheets at the positions corresponding to the opening parts of the reference cell and the other cells with the reference cell taken as a reference point, whereby the ceramic honeycomb structure thus obtained can be manufactured at a low cost, since the cells to be sealed can be easily distinguished, and the holes can be quickly positioned in the drilling step.

10 Claims, 5 Drawing Sheets

U.S. PATENT DOCUMENTS

| | | | |
|---|---|---|---|
| 4,559,193 A | | 12/1985 | Ogawa et al. |
| 4,563,414 A | * | 1/1986 | Ogawa et al. ............... 430/325 |
| 4,740,408 A | * | 4/1988 | Mochida et al. ............ 428/116 |
| 4,810,554 A | * | 3/1989 | Hattori et al. ............... 428/116 |
| 5,021,204 A | * | 6/1991 | Frost et al. .................. 264/630 |
| 5,062,911 A | * | 11/1991 | Hampton et al. ......... 156/89.14 |
| 5,108,685 A | * | 4/1992 | Kragle ................... 264/177.12 |
| 5,514,446 A | * | 5/1996 | Machida et al. ............ 428/116 |
| 5,518,678 A | * | 5/1996 | Miyamoto et al. ...... 264/177.12 |
| 6,159,431 A | * | 12/2000 | Inoue et al. ................. 422/180 |
| 6,673,300 B1 | * | 1/2004 | Allen et al. ................. 264/400 |
| 6,811,737 B1 | * | 11/2004 | Fukuta et al. ................ 264/482 |
| 2002/0020944 A1 | | 2/2002 | Yamaguchi et al. |
| 2003/0041730 A1 | * | 3/2003 | Beall et al. .................... 95/273 |
| 2005/0076991 A1 | * | 4/2005 | Fujita ....................... 156/89.22 |

FOREIGN PATENT DOCUMENTS

| | | |
|---|---|---|
| EP | 0 753 490 A1 | 1/1997 |
| EP | 1 264 971 A1 | 12/2002 |
| JP | A 1-192504 | 8/1989 |
| JP | A 1-259905 | 10/1989 |
| JP | A 2001-300922 | 10/2001 |

* cited by examiner

METHOD OF MANUFACTURING CERAMIC HONEYCOMB STRUCTURAL BODY, AND CERAMIC HONEYCOMB STRUCTURAL BODY

TECHNICAL FIELD

The present invention relates to a method of manufacturing a ceramic honeycomb structure, and a ceramic honeycomb structure. The present invention relates more particularly to a method of manufacturing a ceramic honeycomb structure, and a ceramic honeycomb structure in which reference cells different in shapes of opening parts in end faces from other cells are used as reference points in drilling holes in sheets attached to the end faces of a ceramic honeycomb body having a plurality of cells to thereby facilitate the positioning of the holes and in which the holes can be quickly positioned in a drilling step of the ceramic honeycomb body to thereby obtain the ceramic honeycomb structure inexpensively.

BACKGROUND ART

Figure 8A:
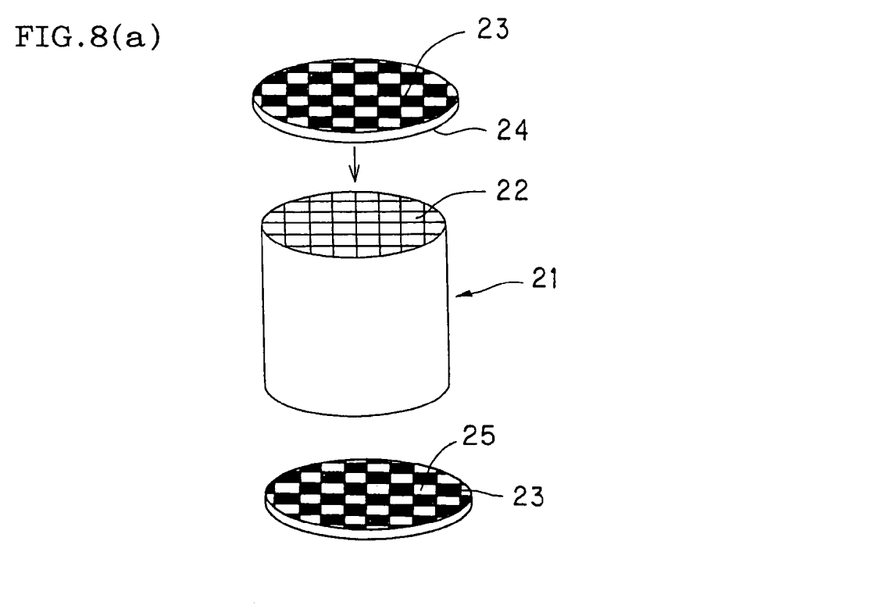

Various manufacturing methods have heretofore been known with respect to a ceramic honeycomb structure in which cells in opposite end faces of a ceramic honeycomb body having a plurality of cells and formed into a honeycomb shape are alternately sealed. For example, a method of manufacturing a ceramic honeycomb structure has been proposed in which a slurry for sealing is filled into opening parts of the cells in the end faces of the ceramic honeycomb body using masks having holes drilled in positions corresponding to the opening parts of the cells and in which the body is fired and formed. Concretely, as shown in FIG. 8(a), rubber or soft resin masks 24, 25 are prepared in which holes 23 are made in positions corresponding to opening parts of cells 22 to be sealed in the end faces of a ceramic honeycomb body 21, and the masks 24, 25 are disposed on the respective end faces of the ceramic honeycomb body 21 by a manual operation. In this case, to form the ceramic honeycomb structure into a configuration in which the cells 22 are alternately sealed in the opposite end faces of the ceramic honeycomb body 21, that is, only the opening part of each cell 22 in one end face is sealed, the masks 24, 25 are formed in such a manner that the drilled holes 23 are arranged in exactly opposite patterns.

Figure 8B:
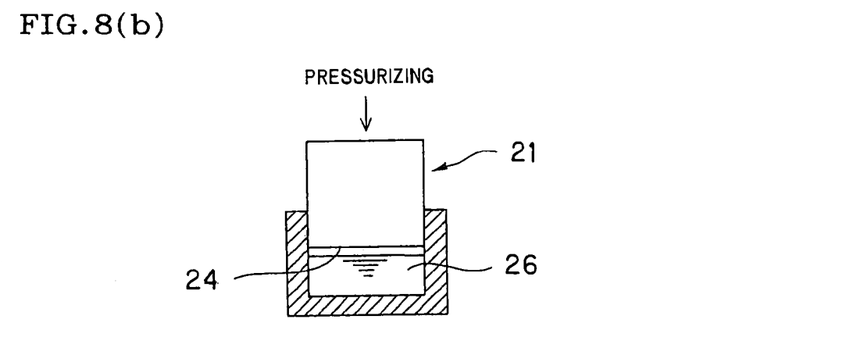
Figure 8C:
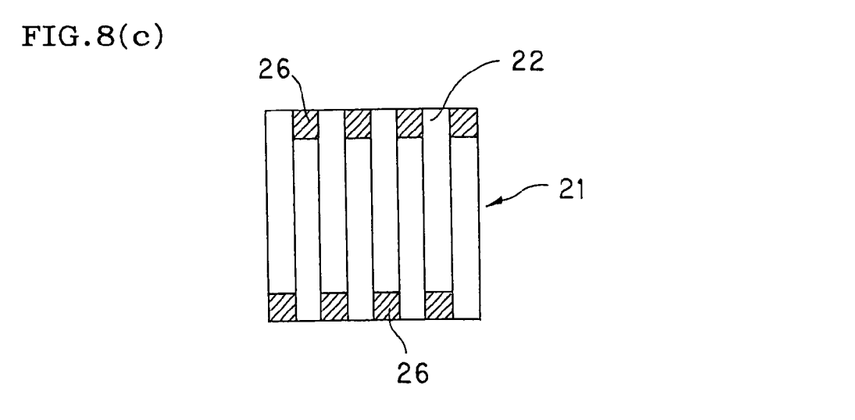

Next, as shown in FIG. 8(b), one end face of the ceramic honeycomb body 21 on which the mask 24 is disposed is immersed into a sealing slurry 26, and pressure is applied to the other end face thereof. Accordingly, the sealing slurry 26 is forced/charged into the opening parts of the cells 22 (see FIG. 8(a)) via the holes 23 (see FIG. 8(a)). The mask 25 (see FIG. 8(a)) is similarly disposed on the other end face of the ceramic honeycomb body 21, and the sealing slurry 26 is charged into the opening parts of the cells 22 (see FIG. 8(a)). In the above-described steps, as shown in FIG. 8(c), after charging the sealing slurry 26 into the opening parts of the cells 22 to be sealed in the opposite end faces of the ceramic honeycomb body 21, the body is fired, and accordingly a targeted ceramic honeycomb structure can be manufactured.

However, in the above-described method of manufacturing the ceramic honeycomb structure, as shown in FIG. 8(a), there have been inconveniences that the masks 24, 25 having the holes 23 in the positions corresponding to the opening parts of the cells 22 are prepared and that it is difficult to correctly dispose the masks 24, 25 on the respective end faces of the ceramic honeycomb body 21. Especially, in a large-sized structure having a diameter of about 300 mm, for which there has been a rising demand in recent years, or in a ceramic honeycomb structure having a high cell density, the number of the opening parts of the cells 22 in the end face reaches several tens of thousands, and this further makes it difficult to dispose the above-described masks 24, 25. Since the masks 24, 25 are disposed on the respective end faces of the ceramic honeycomb body 21 by the manual operation, there have been inconveniences that operator's skill is required, much time is taken, and it is impossible to cope with automation. Furthermore, to reuse the masks 24, 25, the masks need to be cleaned after end of the operation, but the enormous number of the holes are made in the masks 24, 25 as described above, and therefore there has also been an inconvenience that the cleaning is troublesome and time-consuming.

In consideration of these circumstances, in Japanese Patent Application Laid-Open No. 2001-300922, a manufacturing method has been described in which sheets are attached to the opposite end faces of the ceramic honeycomb body formed into a honeycomb shape having a plurality of cells, holes are drilled in the sheets at positions corresponding to the opening parts of the cells, and the slurry for sealing is charged into the opening parts of the cells in the opposite end faces of the ceramic honeycomb body via the holes. Thereafter, the body is fired to manufacture the ceramic honeycomb structure in which the opening parts of the cells are alternately sealed.

In the ceramic honeycomb structure constituted in this manner, disposable sheets which are to be attached to the end faces of the ceramic honeycomb body and in which the holes are drilled are used instead of the masks. Therefore, as compared with the method of manufacturing the ceramic honeycomb structure by the use of the masks, it is easy to dispose the sheets which are substitutes for the masks on the ceramic honeycomb body, and it is also easy to cope with the automation of manufacturing steps.

However, in the above-described method of manufacturing the ceramic honeycomb structure, there has been a problem that it is remarkably difficult to position the holes to be drilled in the sheets with respect to the opening parts in several tens of thousands of cells of the ceramic honeycomb structure in manufacturing the large-sized ceramic honeycomb structure. In a case where the holes are not correctly positioned, there has also been a problem that the holes are drilled in the same cell in the opposite end faces, and an object to alternately seal the cells cannot be achieved. When the ceramic honeycomb body is even slightly curved/deformed, the above-described problem is further complicated.

The present invention has been developed in consideration of the above-described problems, and an object thereof is to provide a method of manufacturing a ceramic honeycomb structure, and a ceramic honeycomb structure in which a reference cell different in a shape of an opening part in an end face from other cells is used as a reference point in drilling holes in sheets attached to the end faces of a ceramic honeycomb body having a plurality of cells. Accordingly, the positioning of the holes is facilitated, further in a drilling step of the ceramic honeycomb body, the holes can be quickly positioned, and the obtained ceramic honeycomb structure can be constituted inexpensively.

DISCLOSURE OF THE INVENTION

To achieve the above-described object, according to the present invention, there is provided a method of manufacturing a ceramic honeycomb structure, comprising the steps of: attaching sheets onto opposite end faces of a ceramic honeycomb body having a plurality of cells and formed into a honeycomb shape; drilling holes in the sheets at positions corresponding to opening parts of the cells; filling, through the holes, a slurry for sealing into the opening parts of the cells in the opposite end faces of the ceramic honeycomb body; firing the body; and alternately sealing the opening parts of the cells, characterized by comprising the steps of: forming the ceramic honeycomb body into a shape having at least one reference cell which is different in a shape of the opening part in the end face from the other cells; and drilling the holes in the sheets at the positions corresponding to the opening parts of the reference cell and the other cells by use of the reference cells as reference points.

When the holes are drilled in the sheets attached to the end faces of the ceramic honeycomb body having the plurality of cells in this manner, the reference cells different in the shapes of the opening parts in the end faces from the other cells are constituted as the reference points. Accordingly, the positioning of the holes is facilitated, the holes can be quickly positioned in the drilling step of the ceramic honeycomb body, and the obtained ceramic honeycomb structure can be inexpensive.

Moreover, preferably in the method of manufacturing the ceramic honeycomb structure of the present invention, images of the end faces of the ceramic honeycomb body to which the sheets have been attached are picked up, the picked-up images are processed, accordingly the positions corresponding to the opening parts of the reference cells are specified, and the holes are drilled by the use of the reference cells as the reference points. By this constitution, it is also possible to cope with automation of manufacturing steps.

Furthermore, in the method of manufacturing the ceramic honeycomb structure of the present invention, the holes are preferably drilled by the use of a laser marker, and the holes are also preferably drilled by the use of one needle or needles in the form of a needle point holder having pitch intervals corresponding to those of the opening parts of the cells.

In the method of manufacturing the ceramic honeycomb structure of the present invention, a corner portion of the opening part of the reference cell is preferably formed into a curved shape having a curvature radius which is 0.25 to 1.0 time an opening width of the other cell. In this case, in the ceramic honeycomb body, facing corner portions of four adjacent reference cells are formed into curved shapes, and the holes are preferably drilled by the use of four reference cells as the reference points. By this constitution, it is further easy to distinguish the reference cells as the reference points.

Additionally, in the method of manufacturing the ceramic honeycomb structure of the present invention, the ceramic honeycomb body is preferably formed by extrusion forming via a ferrule having the shapes of the opening parts of the reference cells. By this constitution, the ceramic honeycomb body having the reference cells can be formed without performing any special step.

Moreover, in the method of manufacturing the ceramic honeycomb structure of the present invention, the other cells are divided into a plurality of blocks in such a manner as to include the reference cells, and the holes are preferably drilled for each of the blocks. When the cells are divided into the blocks in this manner, the shapes of the cells or the intervals of the cell pitches in this region deform little, and therefore the step of drilling the holes in the sheets is facilitated.

Furthermore, in the method of manufacturing the ceramic honeycomb structure of the present invention, a ratio of an opening area of each of the holes to an area of the opening part of each of the other cells in the end face is preferably 30 to 70%. By this constitution, the hole can be effectively prevented from being drilled over cell walls for partitioning the respective cells, or adjacent cells.

On the other hand, a ceramic honeycomb structure of the present invention is preferably manufactured by one of the above-described methods of manufacturing the ceramic honeycomb structure of the present invention. By the use of the manufacturing method constituted in this manner, manufacturing steps are simplified, further a yield is raised, and the obtained ceramic honeycomb structure can be inexpensive.

BRIEF DESCRIPTION OF THE DRAWINGS

FIGS. 4(*a*) and 4(*b*) are perspective views showing steps of attaching a sheet onto the end face of the ceramic honeycomb body in a step order in one embodiment of the method of manufacturing the ceramic honeycomb structure of the present invention;

FIGS. 5(*a*) and 5(*b*) are explanatory views showing a step of drilling holes in the sheet in one embodiment of the method of manufacturing the ceramic honeycomb structure of the present invention, FIG. 5(*a*) is a plan view, and FIG. 5(*b*) is a sectional view;

FIGS. 6(*a*) to 6(*c*) are sectional views showing steps of charging a sealing slurry into cells constituting the ceramic honeycomb body in a step order in one embodiment of the method of manufacturing the ceramic honeycomb structure of the present invention;

FIGS. 8(*a*) to 8(*c*) are explanatory views showing a conventional method of manufacturing a ceramic honeycomb structure in a step order, FIG. 8(*a*) is a perspective view, and FIGS. 8(*b*) and 8(*c*) are sectional views.

BEST MODE FOR CARRYING OUT THE INVENTION

Embodiments of a method of manufacturing a ceramic honeycomb structure of the present invention, and the ceramic honeycomb structure will be concretely described hereinafter with reference to the drawings.

In the method of manufacturing the ceramic honeycomb structure of the present invention, sheets are attached to opposite end faces of a ceramic honeycomb body having a plurality of cells and formed into a honeycomb shape, holes are drilled in positions of the sheets, corresponding to opening parts of the cells, a sealing slurry is charged into the opening parts of the cells in the opposite end faces of the ceramic honeycomb body via the holes, and thereafter the body is fired to manufacture the ceramic honeycomb structure in which the opening parts of the cells are alternately sealed. The ceramic honeycomb body is formed into a shape having at least one reference cell different from the other cells in a shape of the opening part in the end face, and the holes are drilled in the positions of the sheets, corresponding to the opening parts of the reference cell and the other cells, using the reference cell as a reference point.

Figure 1:
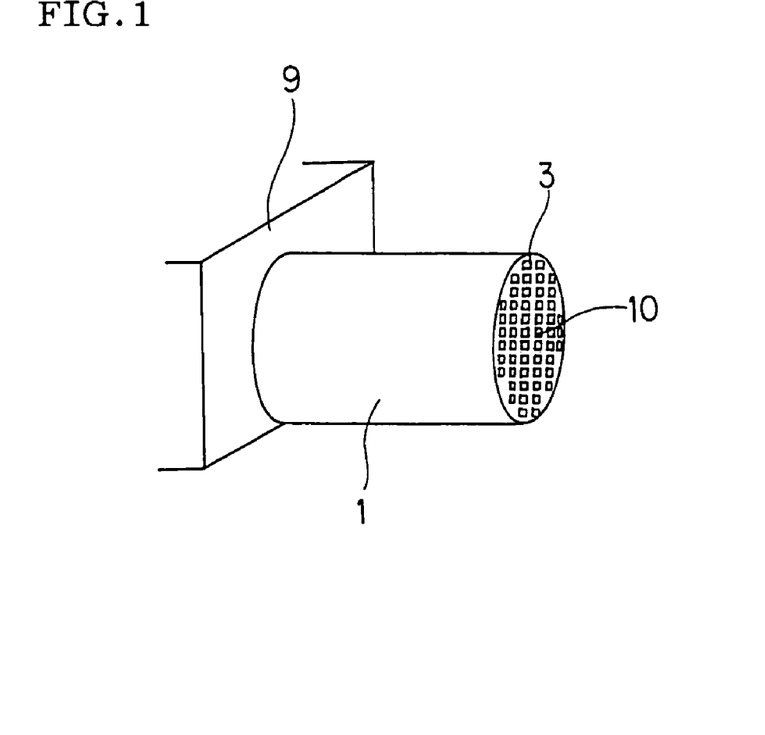
FIG. 1 is a perspective view showing a step of forming a ceramic honeycomb body in one embodiment of a method of manufacturing a ceramic honeycomb structure of the present invention.
Figure 2:
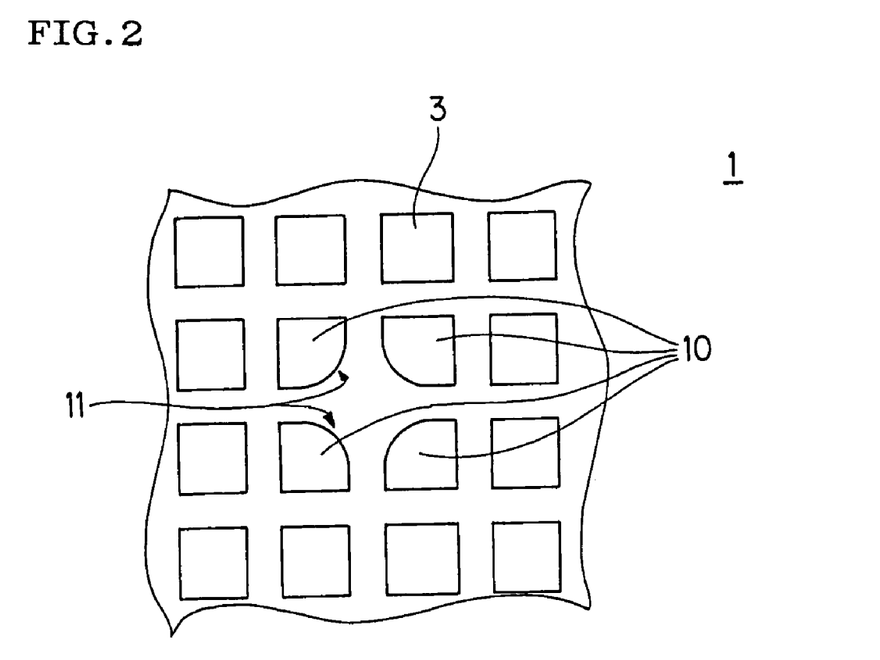
FIG. 2 is a plan view schematically showing an end face of the ceramic honeycomb body for use in one embodiment of the method of manufacturing the ceramic honeycomb structure of the present invention.

As shown in FIG. 1, a non-fired ceramic honeycomb formed body 1 for use in one embodiment of the method of manufacturing the ceramic honeycomb structure of the present invention can be formed by extrusion using cordierite as a raw material, and using a ferrule 9 having shapes of opening parts of the cells 3 and reference cells 10. In the present embodiment, as shown in FIG. 2, the non-fired ceramic honeycomb formed body 1 is preferably formed in such a manner that the shape of the opening part of the reference cell 10 is formed into a curved shape having a curvature radius in a range of 0.25 to 1.0 time with respect to an opening width of the other cell 3, and mutually facing corner portions 11 of four reference cells 10 disposed in the vicinity of one another are formed into cured shapes. By this constitution, it becomes further easy to distinguish the reference cells 10 as reference points.

Figure 3:
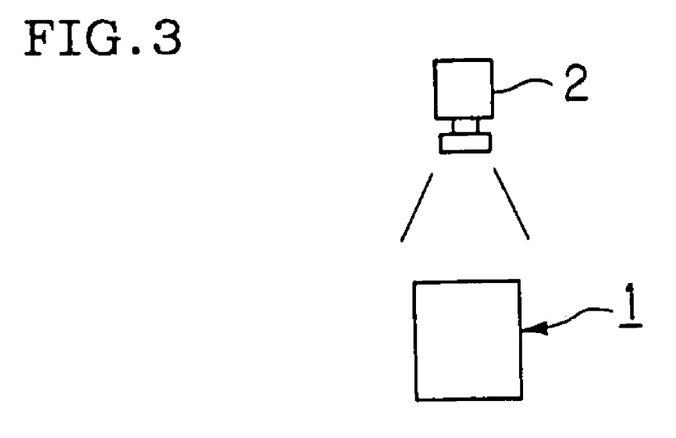
FIG. 3 is a plan view showing a step of processing an image of the end face of the ceramic honeycomb body in one embodiment of the method of manufacturing the ceramic honeycomb structure of the present invention.
Figure 4A:
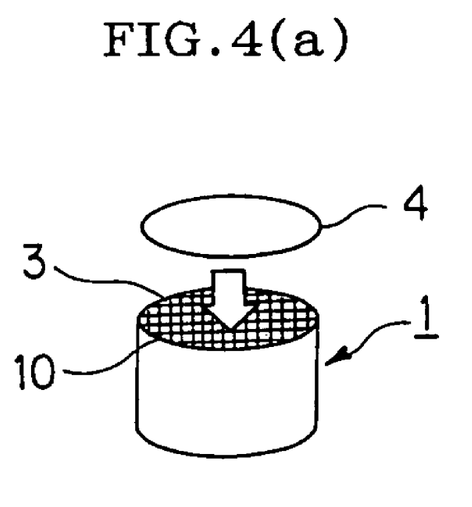
Figure 4B:
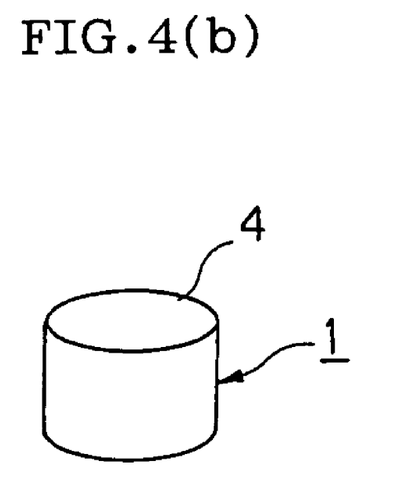

An image of one end face of the non-fired ceramic honeycomb formed body 1 constituted in this manner is picked up by a camera 2 as shown in FIG. 3, the picked-up image is processed, and accordingly the positions of the opening parts of the reference cells 10 (see FIG. 2) in the end face are specified. Next, a sheet 4 having substantially the same shape as that of the end face of the non-fired ceramic honeycomb formed body 1 as shown in FIG. 4(a) is attached to one end face of the non-fired ceramic honeycomb formed body 1 as shown in FIG. 4(b). As the sheet 4, an adhesive sheet on the market is usable.

Figure 5A:
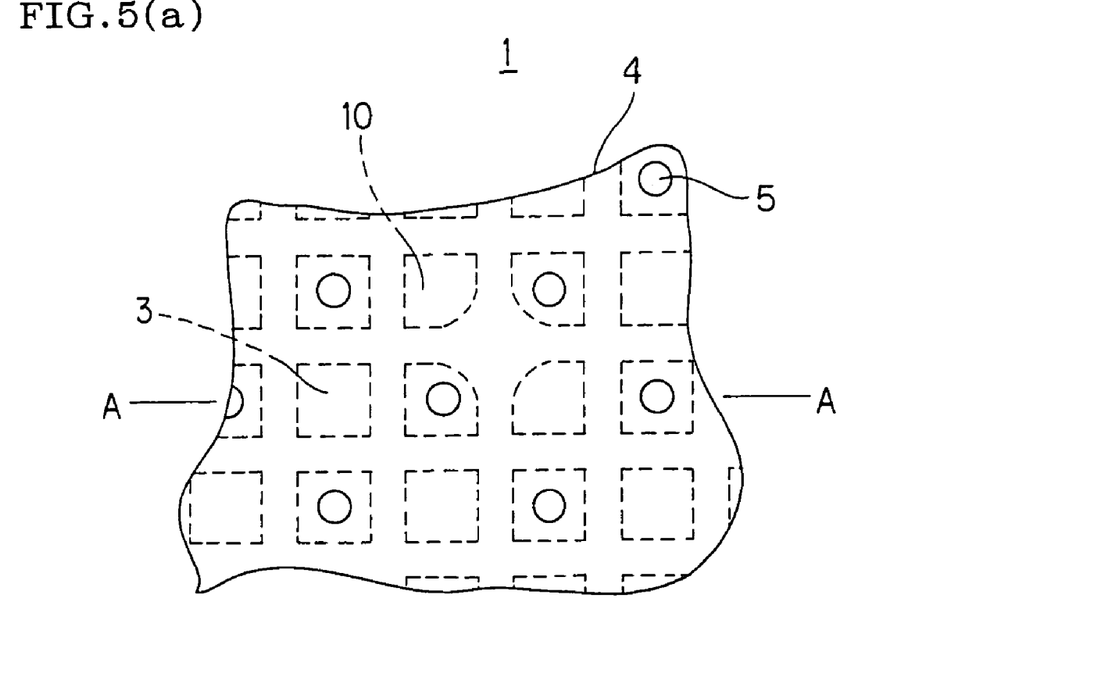
Figure 5B:
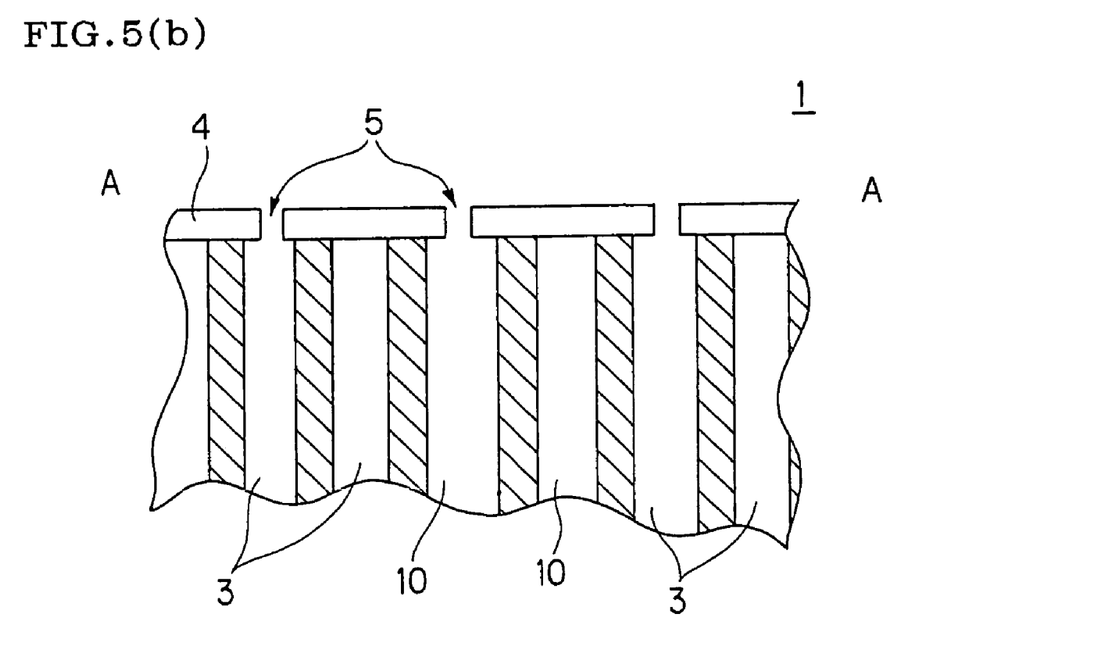

Next, as shown in FIGS. 5(a) and 5(b), the cells 3 are divided into a plurality of blocks for each of various specifications such as an outer diameter and a cell pitch of the non-fired ceramic honeycomb formed body 1. In this case, to constitute the position of the opening part of the reference cell 10 specified by the image processing as the reference point, the cells are divided in such a manner as to include at least one reference cell in each block. Thereafter, positions of the sheet 4 in which the holes are to be drilled are determined using an XYZθ stage on which the non-fired ceramic honeycomb formed body 1 is laid, and holes 5 are drilled in positions corresponding to the opening parts of the cells 3 and the reference cells 10 for each of the regions divided into the blocks using a laser marker.

A ratio of a bore diameter of the hole 5 with respect to an area of the opening part of the cell 3 in the end face is preferably 30 to 70%, further preferably about 50%. Further in the present embodiment, the shape of the hole 5 is circular, and does not have to be the same as an opening shape (quadrangle) of the cell 3 or an opening shape (triangle) of an outer peripheral portion. Therefore, even when there is a slight fluctuation in intervals of the opening parts of the cells in the end face, the hole 5 can be effectively prevented from being drilled over cell walls constituting the cells 3 or the adjacent cells 3, because the bore diameter of the hole 5 is smaller than that of the opening part of the cell 3. It is to be noted that the bore diameter of the hole 5 is appropriately selected in accordance with viscosity of the sealing slurry for sealing the opening part of the cell 3. For example, the size is reduced, when the viscosity is small. The size is enlarged, when the viscosity is large.

By this constitution, since there is little deformation of the shapes of the opening parts of the cells 3 and the pitch intervals in the regions divided into the blocks, the holes 5 can be correctly drilled.

Moreover, in the present invention, the holes can be drilled at once with respect to the whole end face of the ceramic honeycomb body without dividing the cells into the blocks as described above. In this case, a plurality of reference cells are specified by the image processing, positions to be drilled are determined with respect to the whole end face of the ceramic honeycomb body using a plurality of reference points, and then the holes can be correctly drilled at once. It is possible to prevent a problem that excessively much time is required in correcting the positions to be drilled by the deformations of the shapes of the opening parts of the cells and the pitch intervals as in a conventional method of manufacturing the ceramic honeycomb structure.

Figure 6A:
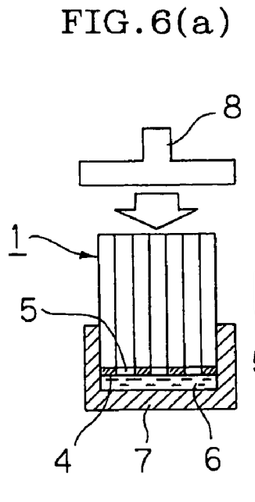
Figure 6B:
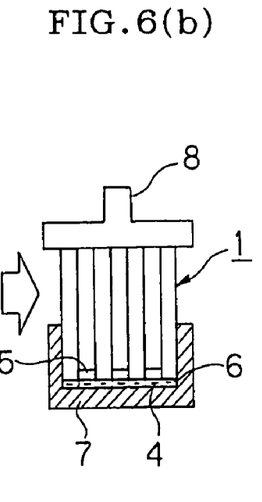
Figure 6C:
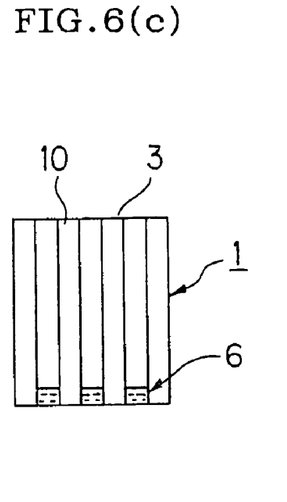

Next, as shown in FIGS. 6(a) to 6(c), a sealing slurry 6 is charged into the opening parts of the cells 3 in the end face of the non-fired or fired ceramic honeycomb body 1 via the holes 5 of the sheet 4. First, as shown in FIG. 6(a), one end face of the ceramic honeycomb body 1 provided with the sheet 4 in which the holes 5 have been drilled is immersed into the sealing slurry 6 in a container 7. Next, as shown in FIG. 6(b), the ceramic honeycomb body 1 is pressed using pressing means 8 to thereby force/charge the sealing slurry 6 into the opening parts of the cells 3 via the holes 5 of the sheet 4. Thereafter, as shown in FIG. 6(c), the sheet 4 is peeled from one end face of the ceramic honeycomb body 1. Additionally, the sheet 4 may be fired and burnt without being peeled.

Thereafter, the sealing slurry 6 is also charged into the opening parts of the cells 3 in the other end face of the ceramic honeycomb body 1 in the same manner as shown in FIGS. 6(a) to 6(c). In this case, to alternately seal the opening parts of the cells 3 in the opposite end faces of the ceramic honeycomb body 1, the holes are drilled in the sheet attached to the other end face with respect to the cells 3 in which any hole is made in one end face. Since the ceramic honeycomb body 1 used in the present embodiment is formed by extrusion forming via the ferrule having the shapes of the opening parts of the reference cells, the positions of the reference cells do not deviate in each end face, and the reference points having high reliability are constituted.

The ceramic honeycomb body 1 in which the sealing slurry 6 has been charged in the opening parts of the cells 3 in this manner is fired, and accordingly a ceramic honeycomb structure having a structure in which the opening parts of the cells are alternately sealed in the opposite end faces can be obtained. By the use of the manufacturing method constituted in this manner, the manufacturing steps are simplified, a yield is enhanced, and the obtained ceramic honeycomb structure of the present invention can be constituted inexpensively. The ceramic honeycomb structure manufactured in this manner is effectively used mainly as a diesel particulate filter (DPF) used for removing graphite and the like from a diesel engine.

It is to be noted that the holes are drilled in the sheets attached to the end faces of the ceramic honeycomb body using the laser marker in the above-described embodiment, but the holes may be drilled using one needle or needles in the form of a needle point holder having pitch intervals corresponding to those of the opening parts of the cells of the ceramic honeycomb body. In this case, when the needle is heated, the hole can be easily drilled.

Figure 7:
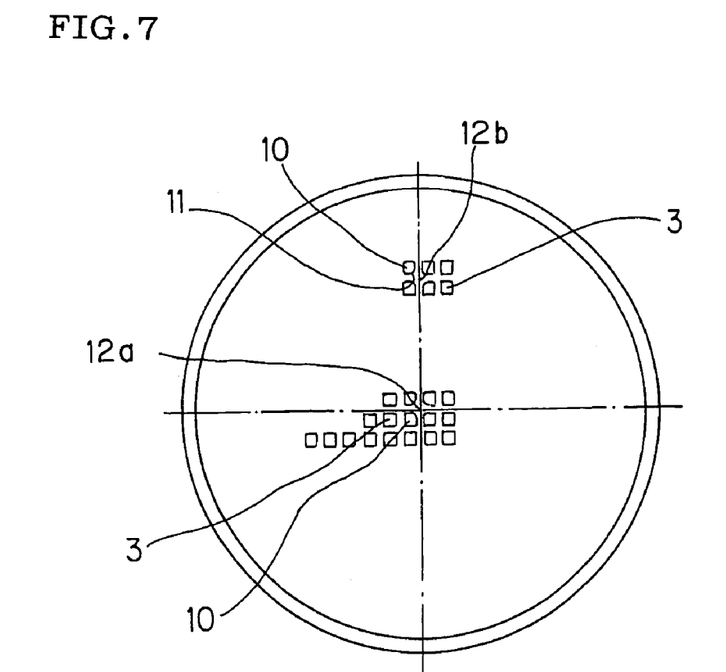
FIG. 7 is a plan view showing another embodiment of the method of manufacturing the ceramic honeycomb structure of the present invention.

Moreover, in the end face of the ceramic honeycomb body, as shown in FIG. 7, the facing corner portions 11 of four adjacent reference cells 10 are formed into the curved shapes, and reference points 12a, 12b each constituted of four reference cells 10 are disposed in two or more places. In this case, even when the ceramic honeycomb body is disposed in an optional position, the positions to be drilled can be specified.

INDUSTRIAL APPLICABILITY

As described above, according to the present invention, reference cells having shapes of opening parts in an end face, which are different from those of other cells, are used as reference points in drilling holes in a sheet attached to the end face of a ceramic honeycomb body having a plurality of cells, so that the positioning of the holes is facilitated, the holes can be quickly positioned in a drilling step of the ceramic honeycomb body, and a ceramic honeycomb structure can be obtained inexpensively.

The invention claimed is:

1. A method of manufacturing a ceramic honeycomb structure, comprising the steps of: attaching sheets onto opposite end faces of a ceramic honeycomb body having a plurality of cells and formed into a honeycomb shape; drilling holes in the sheets at positions corresponding to opening parts of the cells; filling, through the holes, a slurry for sealing into the opening parts of the cells in the opposite end faces of the ceramic honeycomb body; firing the body; and alternately sealing the opening parts of the cells, characterized by comprising the steps of:

forming the ceramic honeycomb body into a shape having at least one reference cell which is different in a shape of the opening part in the end face from the other cells;

using only the at least one reference cell as a reference point to determine the positions corresponding to the opening parts of the at least one reference cell and the other cells; and drilling the holes in the sheets alternatively at the determined positions corresponding to the opening part of the at least one reference cell and the other cells to be plugged at the filling step.

2. The method of manufacturing the ceramic honeycomb structure according to claim 1, further comprising the steps of: picking up images of the end faces of the ceramic honeycomb body, to which the sheets have been attached; processing the picked-up images; specifying the positions in the sheets, corresponding to the opening part of the at least one reference cell; and drilling the holes by the use of the at least one reference cell as the reference point.

3. The method of manufacturing the ceramic honeycomb structure according to claim 1, further comprising the steps of: drilling the holes by the use of a laser marker.

4. The method of manufacturing the ceramic honeycomb structure according to claim 1, further comprising the steps of: drilling the holes by the use of one needle or needles in the form of a needle point holder having pitch intervals corresponding to those of the opening parts of the cells.

5. The method of manufacturing the ceramic honeycomb structure according to claim 1, further comprising the steps of: forming a shape of a corner portion of the opening part of the at least one reference cell into a curved shape having a curvature radius in a range of 0.25 to 1.0 time with respect to an opening width of the other cells.

6. The method of manufacturing the ceramic honeycomb structure according to claim 5, further comprising the steps of: forming facing corner portions of four adjacent reference cells of the ceramic honeycomb body into curved shapes; and drilling the holes by the use of the four reference cells as reference points.

7. The method of manufacturing the ceramic honeycomb structure according to claim 1, further comprising the steps of: forming the ceramic honeycomb body by extrusion forming via a ferrule having the shapes of the opening part of the at least one reference cell.

8. The method of manufacturing the ceramic honeycomb structure according to claim 1, further comprising the steps of: dividing the other cells into a plurality of blocks in such a manner as to include one of the at least one reference cell; and drilling the holes for each of the blocks.

9. The method of manufacturing the ceramic honeycomb structure according to claim 1, wherein a ratio of an opening area of each of the holes to an area of the opening part of each of the other cells in the end face is 30 to 70%.

10. The method of manufacturing the ceramic honeycomb structure according to claim 1, further comprising:

identifying the at least one reference cell from an image of an end face of the honeycomb structure picked up by a camera; and determining a position of the at least one reference cell from the image.

* * * * *